United States Patent Office 3,434,599
Patented Mar. 25, 1969

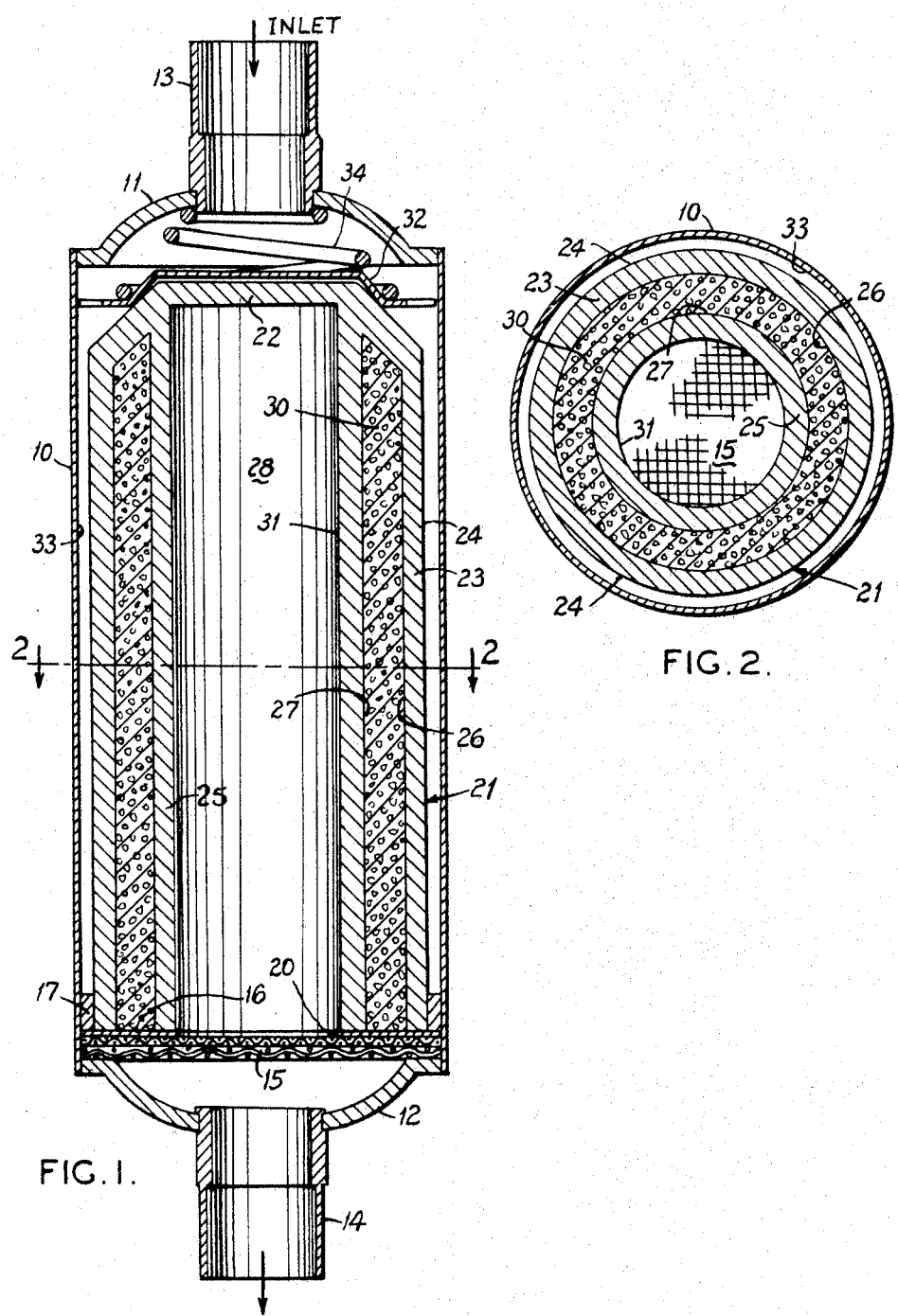

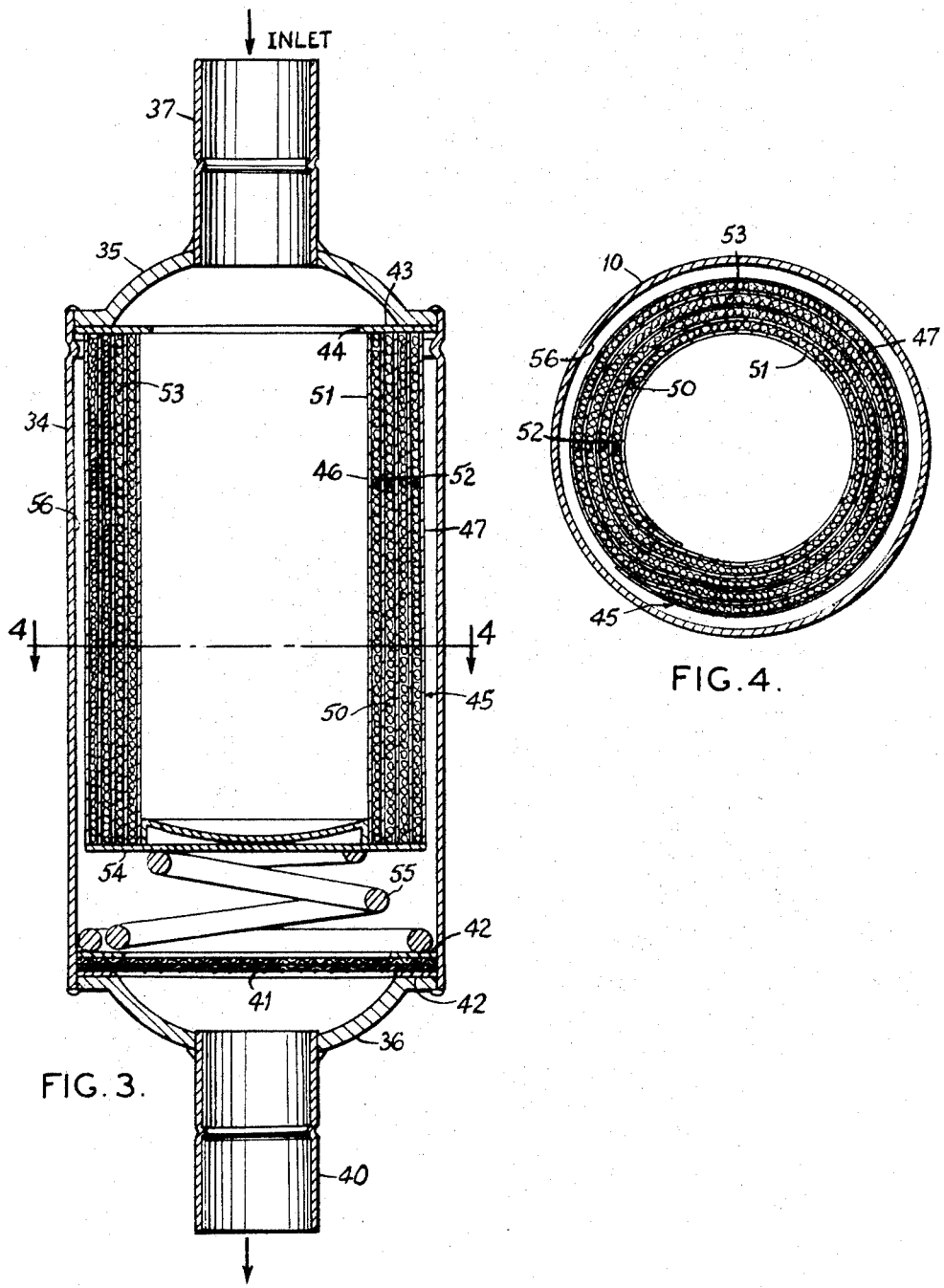

3,434,599
FILTER-DRIER UNIT
William F. Wischmeyer, Ladue, and John E. Hoffman,
Webster Groves, Mo. (both % Sporlan Valve Company,
7525 Sussex Ave., St. Louis, Mo. 63143)
Continuation-in-part of application Ser. No. 426,091,
Jan. 18, 1965. This application Apr. 28, 1967, Ser.
No. 634,738
Int. Cl. B01d 35/00, 25/08, 25/00
U.S. Cl. 210—266                                   4 Claims

ABSTRACT OF THE DISCLOSURE

A tubular metal casing having a replaceable interior filter-drier element which includes a pair of similar coaxial, cylindrical tubes of porous, self-supporting material, the tubes being spaced apart to provide an annular chamber containing a layer of molecular sieve, adsorbent desiccant material. The outer face of the external cylinder tube provides filtration for the refrigerant and the outer face of the internal cylinder tube provides a fine-grained retention surface preventing the passage of desiccant fines from the chamber into the refrigerant stream when the refrigerant flow is inward.

An alternative construction is provided by a plurality of wraps of resin-impregnated fibrous material sandwiching thin layers of desiccant material. The outer face of the external wrap provides a filter surface, and the outer face of each internal wrap provides a desiccant retention surface when the flow is in a like direction.

Cross-reference to related application

This application is a continuation-in-part of co-pending application Ser. No. 426,091, filed Jan. 18, 1965, entitled "Filter-Drier Elements and Method of Making Same," now abandoned.

Background of the invention

This invention relates generally to improvements in a filter-drier unit, and more particularly to a filter-drier unit for use in a refrigeration system.

Refrigeration systems, particularly those manufactured for use in commerce and industry, cannot operate at maximum efficiency unless the refrigerant is both clean and dry. In order to maintain this desirable state, it is necessary to introduce into the refrigerant flow line a filter to remove solid contaminants from the refrigerant liquid, and a desiccant material to remove moisture from the refrigerant.

There are obvious advantages in providing the filter material and the drying material in one unit. In fact, compactness and convenience of replacement practically demand the embodiment of the two features into a single package. However, there are disadvantages also, and existing filter-driers have not solved the attendant problems satisfactorily. One difficulty encountered in filter-drier combinations is that of providing a filter medium having a self supporting capability as well as good porosity. Another problem is the provision of a retention means for the desiccant material downstream of the filter and this becomes particularly important in view of the small size of the fines in the efficient, molecular sieve type of adsorbent desiccants.

A review of the known prior art discloses no filter-drier element which resolves these problems satisfactorily.

One type of filter-drier known in the prior art utilizes a cylindrical ceramic filter but, because the desiccant inside the cylindrical filter element is in direct contact with a relatively large mesh, small area screen, which is transverse to the flow, at the end of the cylinder, the screen is highly susceptible to being plugged and choked by the desiccant fines. Providing this type of filter-drier element with a screen having a smaller mesh and a very much larger area would perhaps alleviate the plugging problem and the concomitant pressure loss but, because the screen is transverse to the filter surface, such change in size would defeat the object of compactness completely. By providing a retention surface for the desiccant which is parallel with the filter surface, applicants achieve a large area of retention surface on which desiccant may be spread thin, and thereby avoid both plugging and serious pressure drop.

A single filtration surface, such as that provided by applicants, is a desirable feature in a combination filter-drier in order that all of the contaminants may be removed before the refrigerant comes into contact with the desiccant material. When the desiccant material is sandwiched between layers of porous material, as in the present invention, a single filtration surface is especially desirable because this will avoid the plugging of the downstream desiccant retention surface with the contaminant material. It is typical of the several examples of the prior art which provide desiccant material sandwiched between layers of porous material that each of these layers is intended to provide a filtration surface. Thus, it is intended in such devices that some contaminant material pass through the desiccant layer and this passage of contaminant material tends to block the second filtration stage.

Filters exist in the known prior art which include cylindrical wraps of filtration material. One of these, intended for use primarily in the dry-cleaning industry, discloses inner and outer tubes, each consisting of a plurality of wraps of glass fiber filtration material sandwiching an annular core of treating material. This type of filter element is intended to provide a filter body rather than a filter surface, and is characterized by having the porosity of each inwardly disposed layer deliberately made progressively less. The disadvantages of a secondary filtration stage which has been discussed at length above, is also present in this type of filter since the inner tube as well as the outer tube is utilized as a filtering medium.

Summary of the invention

The filter-drier combination unit includes an external tube of rigid, porous material, the outer face of which provides a filtration surface for removing contaminant particles suspended in the refrigerant.

A layer of adsorbent, desiccant material adjacent to the interior surface of the external tube provides a drying medium for removing moisture from the refrigerant. A coaxial, internal tube of the same material as the external tube is spaced from the external tube to provide a chamber accommodating the desiccant layer. The outer surface of the internal tube provides a retention surface preventing the passage of desiccant fines into the refrigerant system.

The outer surface of the internal tube provides an elongate, downstream desiccant retention surface for the desiccant fines, thereby enabling a given quantity of adsorbent desiccant material to be spread in a thinner layer than is possible when the downstream desiccant retention surface is transverse to the flow in the refrigerant line and therefore relatively much smaller in area.

The provision of an elongate desiccant retention area, relatively large compared with the usual transverse retention area, allows the use of a less porous, and therefore more retentive, material for containing the desiccant fines for a given pressure drop.

The provision of a retention surface having a cylindrical configuration allows the spreading of a given quantity of desiccant in a thin layer which provides less resistance to refrigerant flow for the given quantity of desiccant.

The provision of an outer filtration surface on the external tube insures that the contaminants will not contact the desiccant material, thereby causing deterioration and impairing its efficiency.

The filtration of the refrigerant before the refrigerant enters the desiccant chamber also prevents the clogging of the retention surface with contaminants. The provision of one surface for filtration of contaminants and an independent surface for retention of the desiccant fines distributes these two flow-inhibiting materials between two surfaces rather than one.

The external tube and the internal tube together constitute a filter-drier element which is encased within a shell to form a compact, filter-drier unit.

A screen downstream of the inner tube and transverse to the refrigerant line is used merely to provide a safety net to prevent debris, caused by inadvertent breakages of the inner tube, from entering the refrigerant stream. The screen is not intended as a filtering medium for removing contaminant particles suspended in a refrigerant, such particles having been substantially filtered on contact with the initial, filter surface. The screen is provided with a large enough mesh so that the refrigerant suffers no pressure drop while passing through the screen.

An alternative mode of providing the above features is achieved by using a compound spiral tube which is formed from a plurality of wraps, each wrap formed from a continuous layer of desiccant material sandwiched between resin-impregnated fabric. The innermost layer of fabric constitutes a filter surface and the inner face of the outwardly wound wraps of fabric constitute a continuous retention surface for the continuous layer of desiccant material.

The features referred to in this summary together with numerous other advantages of the invention, will more clearly appear from the following detailed description of the preferred embodiment, particularly when considered in connection with accompanying drawing.

*Brief description of the drawing*

FIG. 1 is a cross-sectional view of a filter-drier unit;

FIG. 2 is a cross-sectional view as seen along line 2—2 of FIG. 1;

FIG. 3 is a cross-sectional view of a filter-drier unit utilizing a core element of alternative construction, and FIG. 4 is a cross-sectional view as seen along line 4—4 of FIG. 3.

*Description of the preferred embodiment*

Referring now by characters of reference to the drawings, and first to the embodiment of FIGS. 1 and 2, it is seen that the filter-drier unit includes an elongate, cylindrical, tubular shell 10 having outwardly concave closure plates 11 and 12 at opposite ends. An inlet fitting 13 is secured to the closure plate 11 and communicates with the interior of shell 10. An outlet fitting 14 is attached to the closure plate 12 and communicates with the interior of shell 10. The fittings 13 and 14 are adapted to secure the filter-drier unit in the refrigeration line of a refrigeration system.

Seating on the peripheral rim of the outer closure plate 12 and extending across the tubular shell 10 is a safety outlet screen generally indicated at 15. The screen 15 consists of a pair of adjacent open wire panels of different mesh. The safety outlet screen 15 provides a net capable of trapping material which inadvertently breaks loose from the internal sidewall 25 of the body 21 and prevents such material from passing into the refrigerant stream.

A gasket 16 is disposed on top of the safety outlet screen 15 and is secured in place by a ring 17. The ring 17 acts as a spacer as will be explained later upon further description of parts. The gasket 16 includes a central opening 20 through which the refrigerant stream can flow from the inlet fitting 13 to the outlet fitting 14.

The filter-drier element includes a body generally indicated at 21 made of a molded, porous material such as ceramic having a nominal pore size rating substantially between twenty (20) microns and one hundred and fifty (150) microns distributed nonprogressively throughout its thickness. The body 21 is substantially cylindrical in shape and has a closed end portion 22. The cylindrical body 21 has an external tubular portion constituting a peripherally continuous sidewall 23 that provides a large, external, substantially cylindrical filtering surface 24. The body 21 also includes an internal coaxial tubular portion constituting a peripherally continuous sidewall 25 that is spaced from the external sidewall 23 to form a desiccant chamber 26 therebetween. The chamber 26 has an endless cross-section as is best seen in FIG. 2 and specifically has an annular shape. The volume of the desiccant chamber 26 is substantially between 0.05 cubic inch and 0.25 cubic inch per square inch of the outermost surface 24 of the external sidewall 23. The internal sidewall 25 provides an elongate substantially cylindrical outer surface 27. The annular chamber 26 is closed at the body end 22, but is open at the opposite end.

The annular chamber 26 between the two tubular sidewalls 23 and 25 is filled with loose granular desiccant 30, such as molecular sieve beads, activated alumina or silica gel. It will be noted that the arrangement provides a large desiccant retention surface 27 which is separated from the filtering surface 24 by only the thickness of the external sidewall 23 and the thickness of the layer of desiccant 30, and is consequently almost as large as the filtering surface 24. The ratio of the mean surface area of the innermost sidewall and the mean surface area of the outermost sidewall is between 0.4 and 0.93. Because of the efficiency of this coaxial, parallel arrangement only a relatively small amount of desiccant 30 is required. A maximum filtering surface 24 is realized, and a maximum downstream retention surface 27 is provided to retain any fines generated by attrition of the disiccant 30 without causing any excessive pressure drop as the refrigerant traverses the sidewall 25. It will be clear that with a large desiccant retention area available, a given amount of desiccant may be spread in a relatively thin layer, thereby affording only slight resistance to the flow of the refrigerant.

The body 21 is placed in the shell 10 so that its open end seats on the gasket 16, the ring 17 holding the body 21 in spaced relation peripherally from the shell 10. Thus it is seen that the center hollow portion 28 of the internal sidewall 25 is in direct communication to the gasket opening 20 with the outlet fitting 14. The gasket 16 closes the annular chamber 26 and holds the desiccant 30 in place between the sidewalls 23 and 25, or in other words between the external and internal surfaces 26 and 27.

A retainer for the body of the filter-drier element, consisting of a metal plate 32, engages the closed end 22 of the body 21, the plate 32 having a scalloped peripheral edge that engages the shell 10 to hold the closed body end 22 in position so that the periphery of body 21 is spaced from the shell 10 to provide an external passage 33 for the refrigerant flow about the body 21. The flow can enter the passage 33 through the recesses provided in the peripheral, scalloped edge of the retaining plate 32.

A spring 34 is placed in the shell 10 with one end seating on the core-retaining plate 32 and the opposite end engaging the closure plate 11, the spring 34 tending to urge the retaining plate 32 tightly against the closed body end 22 and tending to urge the opposite body end tightly against the sealing gasket 16. Because of the self-supporting nature of the body material, pressure sealing is attained which would not be possible if a non-rigid, filter-drier element were utilized.

When placed in a refrigeration line, the refrigerant will enter through the inlet fitting 13 and flow about the body 21 in the external passage 33. First, the stream will pass through the external filtering surface 24 provided by the external sidewall 23, this large filtering surface 24 serving to filter out any foreign material and contaminants from the refrigerant. Then, the refrigerant will pass through the adsorbent desiccant 30, which is contained in the annular chamber 26 and which is restrained against the flow of the refrigerant by the desiccant retaining surface 27. The desiccant 30 of course, removes the moisture from the refrigerant. After passing through the desiccant 30, the refrigerant will then pass through the desiccant retaining surface 27 and the internal sidewall 25. The retention surface 27 prevents fines generated by attrition of the desiccant 30 from passing through the internal sidewall 25 and into the refrigerant flow. Because the desiccant retention surface 27 is large, and the desiccant layer 30 relatively thin, the generation of desiccant fines does not produce any problem in that there is still sufficient porous area available to pass the refrigerant through the internal sidewall 25 without any excessive pressure drop.

After passing through the internal sidewall 25 the refrigerant flows into the center hollow portion 28 of the internal sidewall 25, and then passes through the gasket opening 20 and through the safety outlet screen 15 for discharge through the outlet fitting 14. The outlet screen 15 is a safety measure designed to trap material which might be inadvertently broken away from the interior face of the internal sidewall 25. The screen 15 is not designed to retain contaminants and has, therefore, a relatively large mesh to avoid pressure drop as the refrigerant passes through.

It will be understood that the unit accommodates reversal of refrigerant flow. Upon such reversal, the inner surface 31 of the internal sidewall 25 becomes the filtering surface and the inner surface 26 of the external sidewall 23 becomes the desiccant retention surface.

Another embodiment is disclosed in FIGS. 4 and 5. In this embodiment, the filter-drier unit includes a cylindrical shell 34 closed at one end by an outwardly concave closure plate 35 and at the opposite end by a similar closure plate 36. An inlet fitting 37 is attached to the closure plate 35 and communicates with the interior of the shell 34. An oulet fitting 40 is attached to the closure plate 36 and communicates with the interior of shell 34.

A safety outlet screen 41, consisting of a pair of open wire panels of different mesh, is sandwiched between a pair of ring gaskets 42 and is disposed transversely to the shell 34 at the outlet fitting 40. Specifically, the ring gasket 42 and the outlet safety screen 41 are seated peripherally against the closure plate 36.

Another ring gasket 43 extends across the shell 34 and is seated against the periphery of the closure plate 35, the gasket 43 being provided with a center opening 44 through which the refrigerant flows in its passage from the inlet fitting 37.

The filter-drier element includes a tubular body generally indicated at 45 and formed from a plurality of continuous, compound wraps. Each wrap includes a layer of desiccant 53 sandwiched between layers of fibrous material 47 such as glass fiber, the layers of fibrous materials being impregnated with a phenolic resin. The innermost face of the tube 45 provides a large internal filtering surface 51 through which the refrigerant passes, such internal filtering surface 51 being adapted to filter foreign material and contaminant solids from the refrigerant.

The inner face of the outwardly wound wraps of the fabric constitutes a continuous retention surface 52 for the continuous layer of desiccant material. The continuous, substantially spiral chamber 50 between the adjacent continuous wraps is filled with a small amount of loose desiccant 53 of the type mentioned previously with respect to the embodiment of FIGS 1 and 2. It will be noted that the filter-drier element made from resin-impregnated fibrous material has a large internal filtering surface 51 and also a relatively large retention surface 52 for each relatively thin spiral layer of desiccant 53 held rigidly between adjacent wraps.

Because the flow of the refrigerant is outward in the embodiment presently discussed, rather than inward as in the previous embodiment, the filter surface is of necessity the innermost surface. In consequence the surface available to retain each spiral of desiccant is larger than the filter surface in contradistinction to the situation which exists in the prior embodiment where the filter surface is larger than the retention surface. However, it is important, not that the filter surface be larger than the desiccant retention surface or vice versa, but that the chosen configuration of parallel tubes allows each surface to be as large as practicable. It will be clear that in both embodiments the direction of the refrigerant flow could be reversed. This is possible because the material constituting the inner spiral (or inner tube in the case of the prior embodiment) and the inner face of the outwardly wound wraps (or of the external tube of the prior embodiment) is the same material.

The method of forming this filter element constituting the second embodiment, comprises the steps of impregnating a fibrous material, such as glass fiber, with a phenolic resin; making an initial wrap 46 of the resin-impregnated fibrous material about a mandrel (not shown); making further continuous wraps over and about a continuous desiccant layer, and then curing the resin to hold the desiccant 53 rigidly between the adjacent wraps to make the fibrous filtering material rigid in a tubular shape.

It will be understood that when the phenolic resin is cured, sufficient resin will adhere to the desiccant particles 53 so that each particle will be rigidly held in place, inhibiting attrition.

When placed in the shell 34 the body 45 has one end pressed tightly against the sealing gasket 43 so that the interior of the body 45 is adapted to receive the refrigerant flow through the gasket opening 44. The opposite end of the body 45 is closed by a retaining plate 54 that assures that the refrigerant will flow through the filter-drier element from the inside to the outside.

A compression spring 55 is located within the shell 34, the spring 55 having one end engaging the retaining plate 54 and the opposite end seating on the uppermost ring gasket 42. The spring 55 tends to urge the one end of the body 45 tightly against the sealing gasket 43 and tends to position the body to provide a peripheral space or passage 56 between the body 45 and the shell 34 so that the refrigerant will pass into such peripheral passage 56 by way of the spirally wound body and then pass from the passage 56 through the outlet fitting 40. As with the prior embodiment the material forming the tube is self-supporting and capable of carrying the load induced into the tube by the spring to provide pressure sealing.

In operation, the refrigerant will flow from the inlet fitting 37 into the interior of the tubular body 45 through the gasket opening 44. First, the refrigerant will pass through the filtering surface 51 provided by the innermost wrap 46 which constitutes a peripherally continuous sidewall, the large filtering surface 51 filtering out foreign matter and contaminants. After passing through the filtering surface 51 provided by the innermost wrap 46 the refrigerant will pass through the desiccant 53 that removes moisture. The refrigerant then passes through the remainder of the compound spiral tube, the last wrap of which constitutes a peripherally continuous sidewall, the desiccant being retained against the force of the refrigerant flow by the continuous inner face constituting the desiccant retention surface 52. Because the desiccant retention surface 52 is large and the layer of desiccant relatively thin, the refrigerant flow proceeds without excessive pressure drop. Upon leaving the body 45, the refrigerant flows through the peripheral passage 56 between the body 45 and the shell 34, then moves through the safety outlet screen 41 and then through the outlet fitting 40.

It will be understood that in both embodiments, regardless of direction of refrigerant flow, the proportion of the mean surface area of the innermost and outermost sidewalls, the proportion of the volume of the desiccant chamber relative to the area of the outermost surface of the external sidewall, and the nominal pore size rating of the sidewall material, remain the same.

Although the invention has been described by making detailed reference to two embodiments, such detail is to be understood in an instructive, rather than in any restrictive sense, many variants being possible within the scope of the claims hereunto appended.

We claim as our invention:

1. A filter-drier element for refrigeration systems comprising:
   (a) an elongate tubular body including:
      (1) an external, peripherally continuous sidewall of rigid, porous material,
      (2) an internal, peripherally continuous sidewall of similar rigid and porous material spaced internally from the external sidewall to provide a chamber between the sidewalls, the walls having substantially the same effective length,
   (b) a layer of adsorbent, desiccant material within the chamber to provide a drying medium removing moisture from the refrigerant,
   (c) one of the sidewalls providing a filter surface, the other sidewall providing a desiccant retention surface downstream from the filter surface in one direction of refrigerant flow, the filter surface removing substantially all of the contaminant solids to prevent deterioration of the desiccant and to prevent clogging of the desiccant retaining surface, and
   (d) the ratio of the mean effective surface area of the innermost sidewall and the mean effective surface area of the outermost sidewall is between 0.4 and 0.93 to provide a relatively thin desiccant chamber thereby to minimize the pressure drop across said chamber,
   (e) the external and internal sidewalls of the tubular body are of substantially coaxial configuration,
   (f) the sidewall material has a nominal pore size rating of between twenty microns and one hundred and fifty microns distributed non-progressively throughout its thickness,
   (g) the effective volume of the disiccant chamber is between 0.05 cubic inch and 0.25 cubic inch per square inch of the outermost surface of the external sidewall, and
   (h) the body is closed at one end to provide a unitary element.

2. A filter-drier element as defined in claim 1, in which:
   (i) at least part of the desiccant material is of the type known as molecular sieve, 3. A filter-drier element as defined in claim 1, in which:
   (i) the tubular body is formed from a plurality of continuous adjacent spiral wraps of resin-impregnated fibrous material, the end of margin of the outermost wrap being attached to its next adjacent wrap to form an external peripherally continuous sidewall, and the end margin of the innermost wrap being attached to its next adjacent wrap to form an internal, peripherally continuous sidewall, and
   (j) the desiccant material is sandwiched between adjacent continuous layers of the spirally wrapped material.

4. A filter-drier element as defined in claim 3, in which:
   (g) at least part of the desiccant material is of the type known as molecular sieve.

References Cited

UNITED STATES PATENTS

| | | | |
|---|---|---|---|
| 2,233,093 | 2/1941 | Carman et al. | 210—266 X |
| 2,512,797 | 6/1950 | Harvuot | 210—494 X |
| 2,617,986 | 11/1952 | Miller | 210—282 X |
| 2,796,989 | 6/1957 | Kovacs | 210—282 |
| 2,963,744 | 12/1960 | Cooper | 210—266 X |
| 3,261,473 | 7/1966 | Riede | 210—494 X |

SAMIH N. ZAHARNA, *Primary Examiner.*

U.S. Cl. X.R.

55—316, 318; 210—282, 315, 494